United States Patent [19]
Miyake et al.

[11] Patent Number: 5,585,159
[45] Date of Patent: Dec. 17, 1996

[54] RECORDING MEDIUM CAPABLE OF SUPPRESSING RESONANCE FROM RECORDING AND REPRODUCING DEVICES

[75] Inventors: Tomoyuki Miyake, Nara; Toshiyuki Tanaka, Moriguchi, both of Japan

[73] Assignee: Sharp Kabushiki Kaisha, Osaka, Japan

[21] Appl. No.: 67,546

[22] Filed: May 26, 1993

[30] Foreign Application Priority Data

Jun. 19, 1992 [JP] Japan ..................... 4-160767

[51] Int. Cl.[6] ......................... G11B 5/66
[52] U.S. Cl. ............ 428/64.3; 428/694 R; 428/694 ML; 428/694 DE; 428/694 RL; 428/694 TP; 428/900; 359/280; 359/281; 359/282; 359/283
[58] Field of Search .............. 428/64.3, 694 R, 428/694 ML, 694 DE, 694 RL, 694 TP, 900; 359/280, 281, 282, 283

[56] References Cited

FOREIGN PATENT DOCUMENTS

| | | |
|---|---|---|
| 0373763 | 6/1980 | European Pat. Off. . |
| 0341785 | 11/1989 | European Pat. Off. . |
| 0487847 | 6/1992 | European Pat. Off. . |
| 0507515 | 10/1992 | European Pat. Off. . |
| 8504837 | 8/1985 | Germany . |
| 62-040684 | 2/1987 | Japan . |
| 3256222 | 11/1991 | Japan . |

*Primary Examiner*—Leszek Kiliman
*Attorney, Agent, or Firm*—David G. Conlin; Milton Oliver

[57] ABSTRACT

A recording medium includes a transparent substrate and a recording layer formed thereon for recording information, and a component made of material with a large loss factor, such as butyl rubber, bond magnet, etc. By suppressing recording medium vibration resonance from a recording and reproducing device, an improved frequency characteristic of a linear motor can be achieved, thereby enabling high access speed. Preferably, the large-loss material also provides a directional magnetic field which facilitates magneto-optical rewriting on the recording layer.

4 Claims, 7 Drawing Sheets

RECORDING MEDIUM CAPABLE OF SUPPRESSING RESONANCE FROM RECORDING AND REPRODUCING DEVICES

FIELD OF THE INVENTION

The present invention relates to a recording medium designed for an optical recording and reproducing device, and for a magnetic recording and reproducing device.

BACKGROUND OF THE INVENTION

Recently, with the development of computers, a data recording device (a peripheral device thereof) is required to satisfy demands for large capacity and for high speed data transfer. To meet the demand, fixed-type magnetic recording devices and fixed-type optical recording devices have been used. In these types of information recording devices, a disc-shaped recording medium is normally adopted, and a rotatable actuator or linear motor is used for driving an information reading section.

Using the above devices, high speed access by a head can be achieved either by making larger the thrust of the head for recording and reproducing information or making a track jump onto a desired recording track accurate. The first method is enabled, for example, by making stronger the magnet used for the linear motor.

In the second method, conventionally the distance to the desired track was measured when accessing information. Recently, improved accuracy is obtained by counting the number of tracks to be jumped to the desired track (track counting method) instead of measuring the distance.

In adopting the track counting method, the following condition must be satisfied: A frequency characteristic of the linear motor system is constant until at a high frequency. In other words, each component of the linear motor is designed such that a resonance thereof is not generated until at a high frequency. By suppressing the resonance, a focus and tracking servo can be made stable, thereby enabling high speed track counting.

The magneto-optical recording medium whereon/wherefrom information can be recorded/reproduced utilizing the magneto-optical effect is a rewritable recording medium. With an increase in the demand for high speed access and data transfer, a so-called overwriting method on the recording medium which does not require an erasing process has been studied and developed. The overwriting method is classified into two types: They are the magnetic field modulation by reversing NS of the magnetic field, and light intensity modulation.

The method for overwriting through light intensity modulation is viewed with interest as the most effective method. For example, in the method disclosed in Laid-open published Japanese patent application No. 63-148446 (148446/1988), only a magnet used in writing is required without requiring an initialization magnet. Moreover, the reversing of the magnetic field is not required in this method. In the optical recording medium of the above arrangement, because the magnetization direction thereof can be reversed only by varying the intensity of the laser beam when writing, a recording can be carried out without an erasing process. Therefore, the above overwriting method enables a substantially improved access speed to be achieved.

However, the recording and reproducing device using the above optical recording medium has the following disadvantage: Since an optical pickup with a weight heavier than the magnetic head is required, and components of the optical pickup and the optical pickup itself tend to have low resonance frequencies, access speed is slower than the magnetic recording and reproducing device wherein a magnetic recording medium is adopted. In order to counteract this, a frequency characteristic of the linear motor is set such that the disk resonance is not generated until at a still higher frequency.

Figure 5:
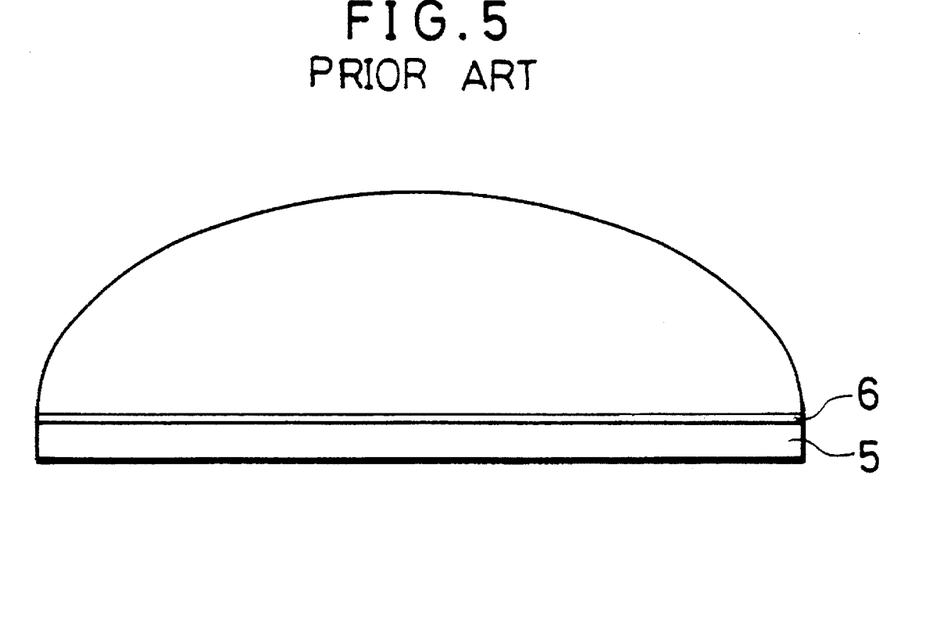
FIG. 5 is an explanatory view showing the configuration of a conventional magneto-optical disk.
Figure 6:
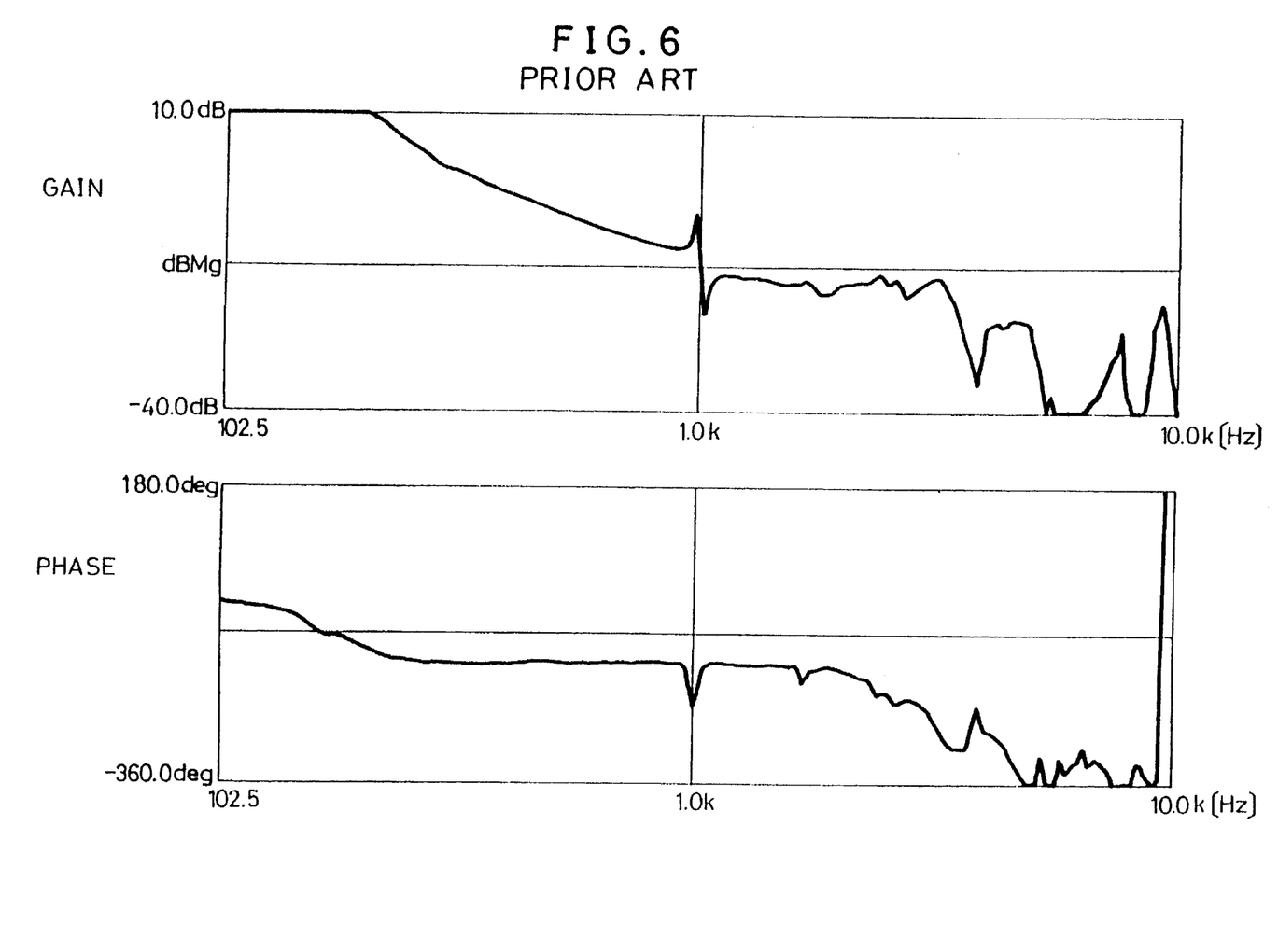
FIG. 6 is a graph which shows a frequency characteristic when a substrate made of polycarbonate is adopted in the conventional magneto-optical disk.
Figure 7:
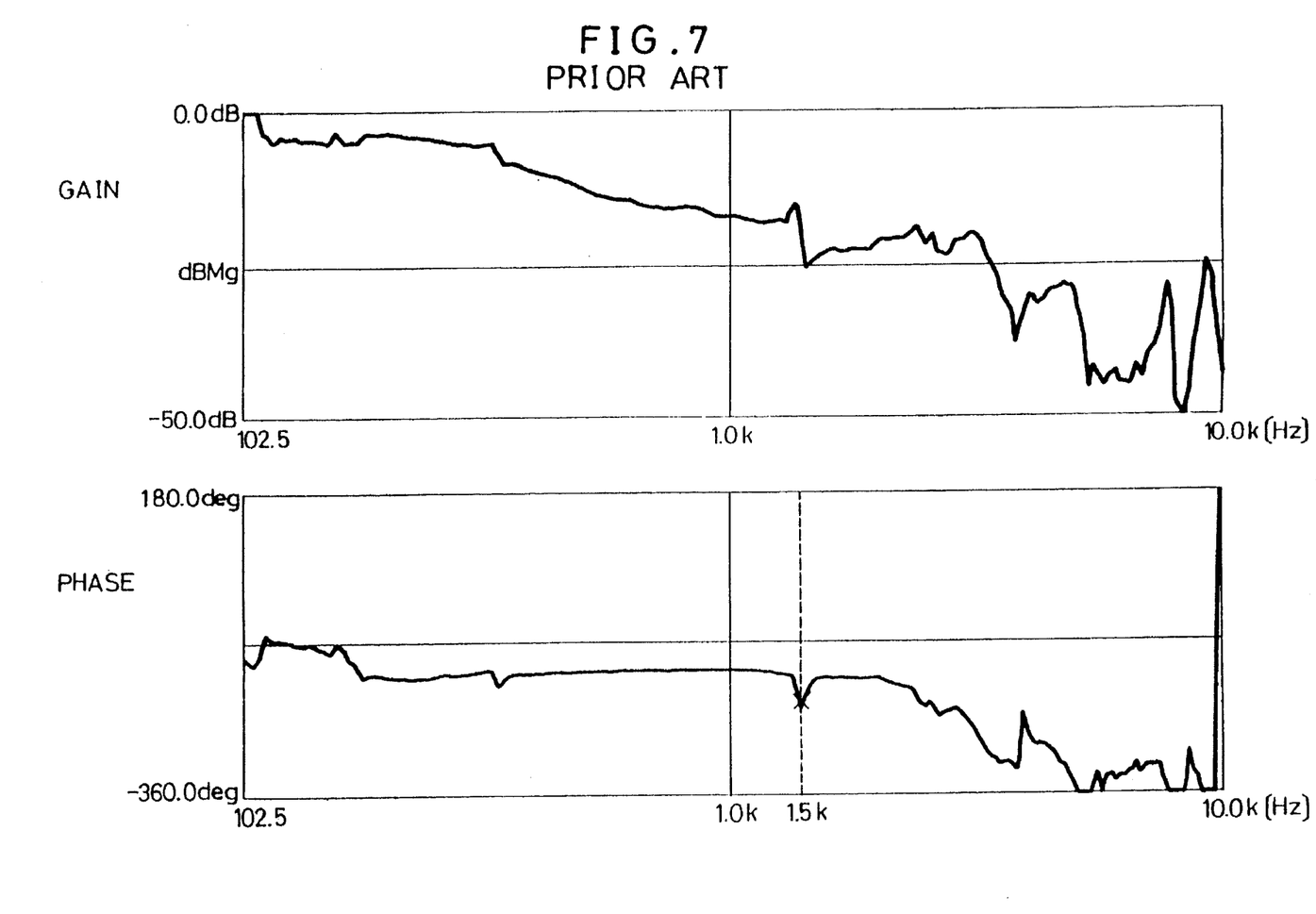
FIG. 7 is a graph which shows a frequency characteristic when a substrate made of glass is adopted in the conventional magneto-optical disk.

As shown in FIG. 5, when adopting a recording medium including a substrate 5 and a recording layer 6 provided thereon, the substrate 5 resonates due to the vibration from a spindle motor (not shown) which rotates the recording medium. For example, FIG. 6 and FIG. 7 show respective frequency characteristics of the linear motor when polycarbonate (PC) and glass are respectively used for the substrate 5 of the recording medium. Here, the frequency characteristic of the linear motor is defined as a frequency response shown by a gain characteristic curve and a phase characteristic curve obtained from a signal A and a signal B. Here, the signal A which is a track error signal is sent under the control of the focus and tracking servo, and the signal B is detected after passing through a servo circuit.

As can be seen from the figures, PC and glass have respective resonance frequencies of 1 kHz and 1.5 kHz. The above resonance frequencies are substantially coincident with the respective natural oscillation frequencies determined by the characteristics of a material used in the substrate (such as a specific gravity, Young's modules, etc.), and a shape of the substrate. Because the material used in the substrate 5 determines the resonance frequency, it is difficult to avoid the resonance frequency. For this reason, in the conventional recording medium, it is difficult to obtain such a frequency characteristic that the resonance is not generated until at a still higher frequency.

SUMMARY OF THE INVENTION

An object of the present invention is to provide a recording medium which enables a linear motor provided in a recording and reproducing device to have such a frequency characteristic that recording medium resonance is not generated until at a high frequency, the linear motor being used in driving an information reading section.

In order to achieve the above object, the recording medium in accordance with the present invention is characterized by including a transparent substrate; a recording layer for recording information, formed on the transparent substrate; and a member having a large loss factor for suppressing vibrations from the recording and reproducing device, the member being formed on one surface of the recording layer opposite the transparent substrate side.

In order to achieve the above object, another recording medium of the present invention which includes a recording layer for recording information utilizing the magneto-optical effect, the recording layer being formed on a transparent substrate, is characterized in that a bond magnet whose magnetization direction is arranged in one direction perpendicular to the surface of the recording layer is provided on one surface of the recording medium opposite the transparent substrate side.

According to the above arrangement, when a disc-shaped recording medium loaded in a recording and reproducing device is driven, for example, vibrations from the recording medium generated when the spindle motor is driven are absorbed by a member with a large loss factor or a bond magnet so as to suppress the recording medium resonance.

This permits the linear motor to have such frequency characteristic that recording medium resonance is not generated until at a high frequency.

As described, by suppressing the resonance of the recording medium, the information reading section provided in the recording and reproducing device, for example, an optical pickup has such frequency characteristic that the recording medium resonance is not generated until at a high frequency. Because this permits a stable servo of the optical pickup, access speed can be improved.

Furthermore, when the recording medium, which includes a bond magnet, and a recording layer for recording information utilizing the magneto-optical effect is adopted, an overwriting is permitted through the light intensity modulation without an externally provided magnet. This enables a substantially improved access speed and a thin-type magneto-optical recording and reproducing device to be achieved.

For a fuller understanding of the nature and advantages of the invention, reference should be made to the ensuing detailed description taken in conjunction with the accompanying drawings.

BRIEF DESCRIPTION OF THE DRAWINGS

FIGS. 1 through 3 show an embodiment of the present invention.

FIGS. 5 through 7 show conventional examples.

DESCRIPTION OF THE EMBODIMENTS

Figure 1:
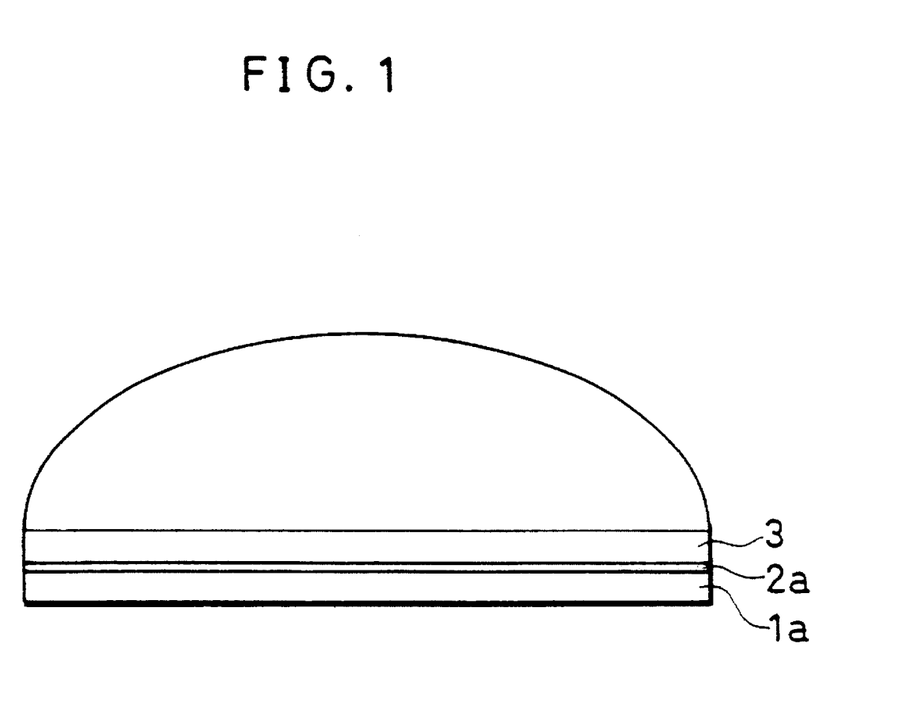
FIG. 1 is an explanatory view showing the configuration of a magneto-optical recording medium of the present invention.
Figure 2:
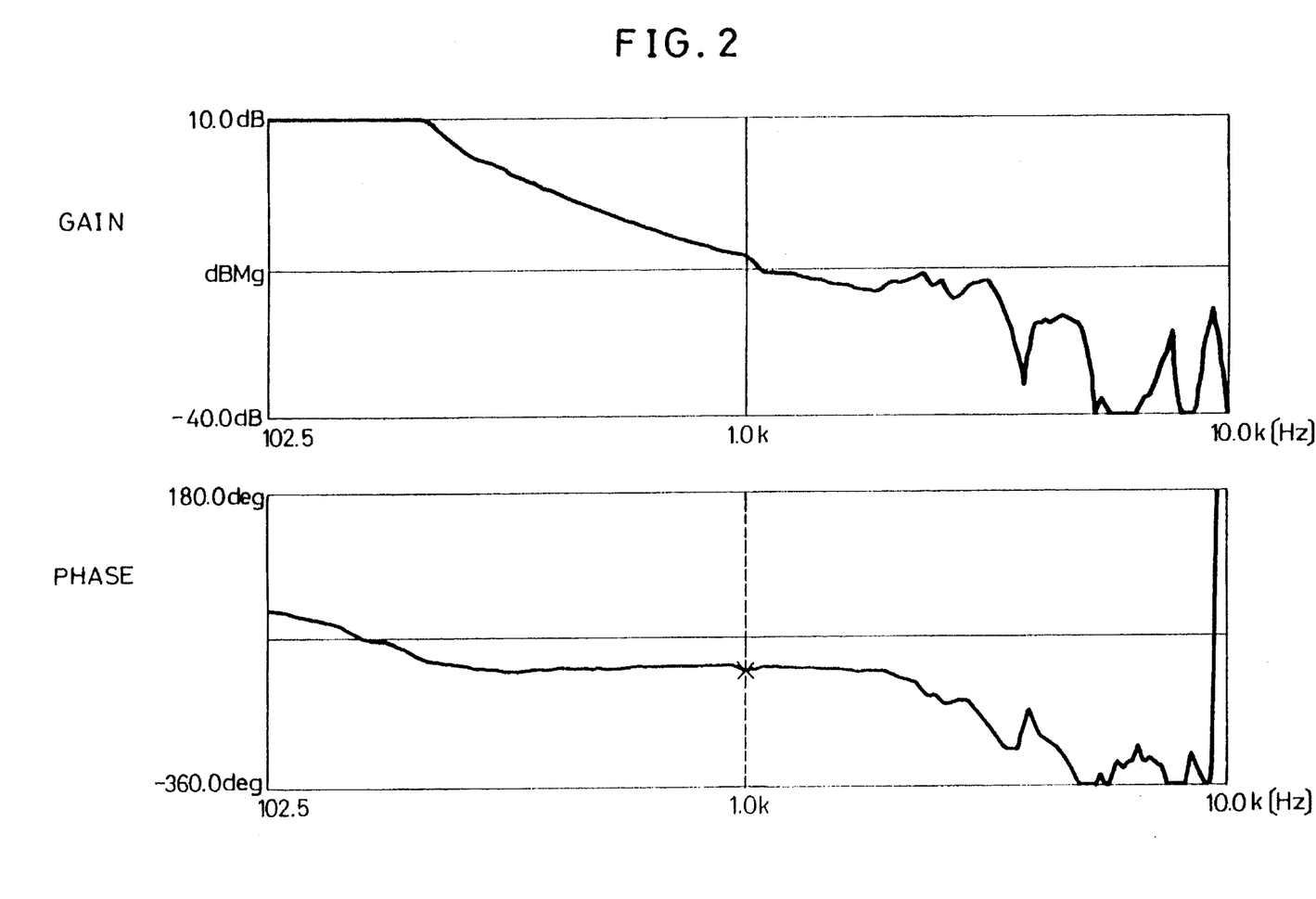
FIG. 2 is a graph which shows a frequency characteristic when a substrate made of polycarbonate is adopted in the magneto-optical disk of FIG. 1.
Figure 3:
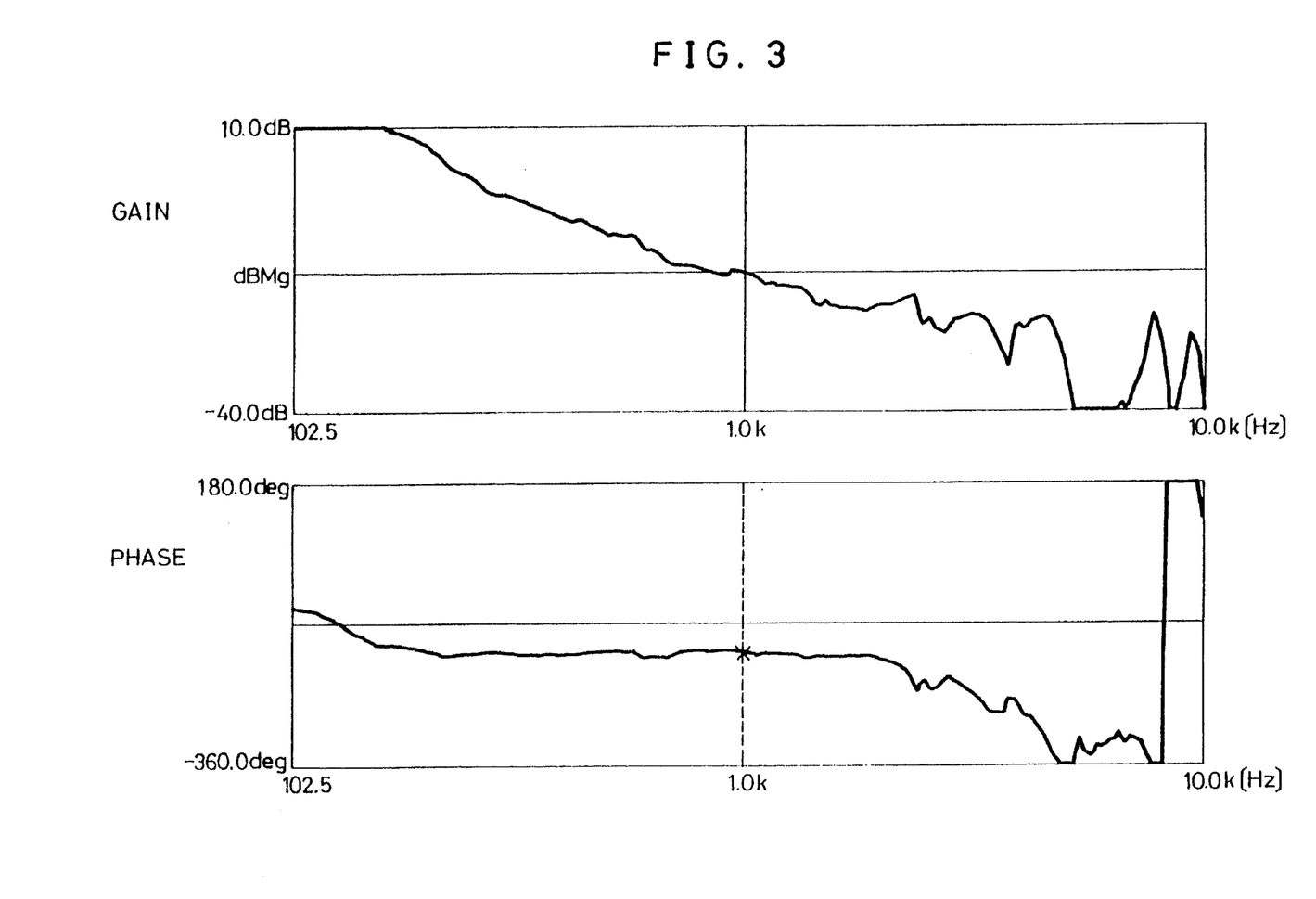
FIG. 3 is a graph which shows a frequency characteristic when a substrate made of glass is adopted in the magneto-optical disk of FIG. 1.

The following description will discuss one embodiment of the present invention with reference to FIGS. 1 through 3.

As shown in FIG. 1, a magneto-optical disk (recording medium) of the present invention includes a transparent substrate 1a, a magneto-optical recording film 2a (recording layer) formed on one surface of the transparent substrate 1a, and a butyl rubber layer 3 with a large loss factor formed on the magneto-optical recording film 2a. In the present embodiment, the thickness of the butyl rubber layer 3 is set at 1 mm, and the butyl rubber layer 3 is for example laminated on the magneto-optical recording film 2a using a bonding agent. The magneto-optical disk is arranged such that recording and reproducing are carried out from the side of the transparent substrate 1a.

Using the above magneto-optical disk, the frequency characteristic of a linear motor provided in the recording and reproducing device was measured. As shown in FIG. 2 and FIG. 3, the disk resonance exhibited in the conventional case was not generated, and the frequency characteristic was substantially constant until even higher frequency than 2 kHz. Here, FIG. 2 shows the case where the transparent substrate 1a made of polycarbonate (PC) is adopted, and FIG. 3 shows the case where the transparent substrate 1a made of glass is adopted.

Using the above magneto-optical disk, access speed was calculated when an improved frequency characteristic of the linear motor was obtained. The result was 20 ms/5.3 mm moving distance under the following condition: optical pickup weight (17 g); thrust constant of the linear motor (2.58 N/A); and a maximum current (2 A). To be compared, in the case of a conventional magneto-optical disk as shown in FIG. 5, the frequency characteristic of the linear motor was such that resonance appeared at a frequency in the vicinity of 1 kHz, and the access speed obtained under the same condition as the above was 25 ms.

Therefore, by providing the butyl rubber layer 3, the resonance of the magneto-optical disk can be suppressed, and such an improved frequency characteristic of the linear motor is achieved that the frequency is substantially constant until 2 kHz. As a result, the resonance of the tracking servo of the optical pickup can be suppressed, thereby improving access time of the optical pickup, for example, by 5 ms (20%) under the above condition.

In the present embodiment, the butyl rubber has been used as being a material suppressing the vibrations from the recording and reproducing device. However, the present invention is not limited to this. Other materials with large loss factors such as polymeric materials made of acrylic resin (Vendor: 3M Corp.) may be used as well.

Additionally, many of the polymeric materials have the characteristic of viscoelasticity, and the loss factors thereof change by the connecting area and by the thicknesses thereof. Therefore, the loss factor η is determined not only by the characteristic of the material but also by the installing method (area), thickness, temperature, etc. With the combination of the above, the loss factor is preferably set at $\eta \geq 0.1$ in the present embodiment.

Figure 4:
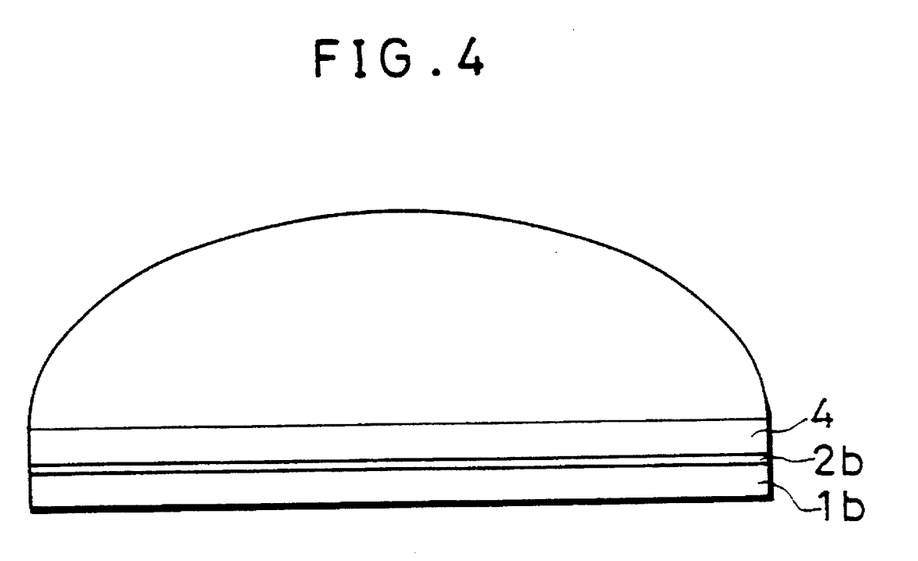
FIG. 4 is an explanatory view showing the configuration of another magneto-optical disk of the present invention.

The following description will discuss another embodiment of the present invention with reference to FIG. 4.

A magneto-optical disk (recording medium) of the present embodiment includes a transparent substrate 1b, a magneto-optical recording film 2b (recording layer) for use in recording information utilizing the magneto-optical effect, formed on the transparent substrate 1b, and a bond magnet 4 of SmCo magnet series (for example, MRP-4 magnets: Dia Rare-Earth Magnetics Corp.) with the thickness of 0.8 mm forming a magnetic layer 4 on the magneto-optical recording film 2b. Here, magnetic field generated from the surface of the bond magnet 4 is substantially 300 Oe at 0.2 mm above the surface of the magnet. In this arrangement, the recording film with a 2–5 layer structure is employed for the magneto-optical recording film 2b whereon recording operations are carried out through the light intensity modulation.

According to the above arrangement, when recording and reproducing are carried out on and from the magneto-optical disk loaded in the magneto-optical recording and reproducing device, the resonance particular to the transparent substrate 1b due to the vibration from the spindle motor is absorbed by the bond magnet 4. Therefore, the resonance of the tracking servo of the optical pickup can be suppressed as in the case of the previous embodiment, thereby improving access speed of the optical pickup.

Moreover, because the magneto-optical recording film 2b is arranged so as to permit overwrite through the light intensity modulation, a still improved access speed can be achieved.

When overwriting is carried out, a magnet is used for applying a magnetic field whose magnetization direction is arranged in one direction. In the arrangement of the present invention, since the above magnet is integrally provided with the magneto-optical disk, the magnet is not required to be separately provided in the device. Thus, the device can be made smaller.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, designed for a recording and reproducing device, whereon and wherefrom recording and reproducing of information are carried out, comprising:

a transparent substrate;

a first layer, having two major surfaces, formed on said transparent substrate, for recording thereon and reproducing therefrom information utilizing magneto-optical effect; and a second layer, of a material with a loss factor large enough to prevent substrate resonance at or below 1.5 kHz, suppressing vibrations from the recording and reproducing device, and applying a magnetic field, of a constant intensity and aligned perpendicular to said major surfaces of said first layer, onto said first layer for recording by a light intensity modulation, said second layer being formed on that one of said major surfaces of said first layer opposite the major surface adjacent said transparent substrate.

2. A recording medium as set forth in claim 1, wherein said second layer includes a magnet whose magnetization is arranged in one direction perpendicular to said major surfaces of said first layer.

3. A magneto-optical system for recording and reproducing information, comprising a recording and reproducing device and a magneto-optical recording medium, said recording and reproducing device including: driving means for driving said recording medium, and light intensity modulation means for modulating an intensity of light to be projected onto said recording medium when recording information, based on the information to be recorded, and said recording medium including:

a transparent substrate;

a first layer formed on said transparent substrate, for recording thereon and reproducing therefrom information utilizing magneto-optical effect; and a second layer, of a material with a loss factor large enough to prevent substrate resonance at or below 1.5 kHz, for suppressing vibrations from said driving means, and for applying a magnetic field of a constant intensity and aligned perpendicular to said major surfaces of said first layer, onto said first layer for recording by a light intensity modulation, said second layer being formed on that one of said major surfaces of said first layer opposite the major surface adjacent said transparent substrate.

4. A magneto-optical recording medium, designed for a recording and reproducing device, whereon and wherefrom recording and reproducing of information are carried out, comprising:

a transparent substrate;

a first layer, having two major surfaces, formed on said transparent substrate, for recording thereon and reproducing therefrom information utilizing magneto-optical effect; and a second layer, of a material with a loss factor of not less than 0.1, suppressing vibrations from the recording and reproducing device, and applying a magnetic field, of a constant intensity and aligned perpendicular to said major surfaces of said first layer, onto said first layer for recording by a light intensity modulation, said second layer being formed on that one of said major surfaces of said first layer opposite the major surface adjacent said transparent substrate.

* * * * *